United States Patent [19]

Ruff et al.

[11] Patent Number: 4,619,671
[45] Date of Patent: Oct. 28, 1986

[54] ENERGY TRANSFER DEVICE FOR DESULFURIZING INSTALLATION

[75] Inventors: Klemens Ruff, Bochum; Ludwig Suhr, Essen; Paul Paikert, Witten, all of Fed. Rep. of Germany

[73] Assignee: GEA Luftkuehlergesellschaft Happel GmbH & Co, Bochum, Fed. Rep. of Germany

[21] Appl. No.: 738,735

[22] Filed: May 29, 1985

[51] Int. Cl.$^4$ .................. B01D 47/05; B01D 53/14
[52] U.S. Cl. ................................ 55/222; 55/269; 55/80; 165/134.1
[58] Field of Search ............ 55/222, 269, 80; 165/3, 165/48.1, 134.1

[56] References Cited

U.S. PATENT DOCUMENTS

| 3,220,118 | 11/1965 | Isch-Wall et al. | 55/269 X |
| 3,839,849 | 10/1974 | Maniya | 55/222 |
| 3,844,740 | 10/1974 | Brandt | 55/222 X |

FOREIGN PATENT DOCUMENTS 2383396  11/1978  France .................... 55/222

Primary Examiner—Charles Hart
Attorney, Agent, or Firm—Michael J. Striker

[57] ABSTRACT

In order to obtain the requisite chimney temperature of cleaned gas discharged from a desulfurizing installation, and in order to avoid problems resulting at temperatures below the dew point of sulfuric acid in heat exchangers made of steel, the invention provides the following measures: the heat exchange between the crude gas stream and the cleaned gas stream is made in a first stage including conventional heat exchangers made of steel. An additional stage of heat exchangers between the crude and cleaned gas streams is constructed of corrosion-resistant and adhesion inhibiting plastic material and operating in a lower temperature range. Transfer conduits of corrosion-resistant material connect the lower temperature heat exchangers to forcibly transfer a heat carrying fluid.

15 Claims, 6 Drawing Figures

ENERGY TRANSFER DEVICE FOR DESULFURIZING INSTALLATION

BACKGROUND OF THE INVENTION

The present invention relates in general to an energy transfer device and in particular to an energy transfer device for use in a desulfurizing plant including a first heat exchanger arranged in a stream of crude gas flowing to a scrubber, a second heat exchanger arranged in a stream of clean gas behind the scrubber, the first and second heat exchangers including heat exchange pipes and being interconnected by transfer conduits for a forcibly circulating heat carrying medium, the heat exchanging pipes and the transfer conduits being made of a pressure resistant material, such as steel.

In the course of an intensified effort to protect environment, both the newly constructed power plants as well as existing power plants must take precaution for desulfurizing flue gas. The desulfurizing process takes place principally in wet desulfurizing systems in which the flue gases in the cleaning process are cooled by a scrubbing solution so long until the gas leaves the scrubber at a temperature of about 50° C.

Thereafter, however, it is necessary that the cleaned flue gas be again heated to a temperature of at least 72° C. before it is released in the atmosphere. For this reheating, different methods are developed. The most energy saving reheating methods are those in which the heat energy required for the reheating is withdrawn from the hot crude gas to be cleaned.

For this purpose a heat exchanger with ribbed heat exchanging pipes has been installed in the stream of crude gas before the scrubber and this heat exchanger is connected via a heat carrying fluid such as for example water mixed with an antifreeze medium, in a second heat exchanger also provided with ribbed heat exchanging pipes arranged in the stream of clean gas behind the scrubber. By means of this reheating device it is possible to withdraw heat from the crude gas stream and to transfer the heat energy via the heat carrying medium into the clean gas stream. As a rule, the pipes and heat medium transfer conduits for such heat exchangers are made of steel. Such a construction however encounters considerable difficulties in the case when temperature is in the range of the dew point of sulfuric acid. It has been already proposed to provide the individual parts of the heat exchangers with coatings. It has been found however that due to large molecule structure of the coating material in the course of time residues of diffused molecules are formed below the coating and destroy the base material and loosen the coating. Known is also the application of enameled heat exchangers employed in connection with flue gas desulfurizing installations. Nevertheless even this measure, for various reasons has not been found as satisfactory.

SUMMARY OF THE INVENTION

It is therefore a general object of the present invention to overcome the disadvantages of prior art heat transfer devices of the above described kind.

In particular, it is an object of the present invention to provide an improved energy transfer device for a desulfurizing plant which guarantees a flawless cleaning operation of the crude gas over prolonged periods of time.

Another object of this invention is to provide such an improved energy transfer device which can be constructed without the use of expensive materials.

Still another object of this invention is to provide such an improved energy transfer device which has an increased service life.

In keeping with these objects and with others which will become apparent hereafter, one feature of the invention resides, in an energy transfer device of the aforedescribed kind, in the provision of a third heat exchanger arranged in the stream of crude gas between the first heat exchanger and the scrubber, a fourth heat exchanger arranged in the stream of clean gas between the scrubber and the second heat exchanger, the third and fourth heat exchangers operating at a lower temperature level than that of the first and second heat exchangers, said third and fourth heat exchangers including respectively a plurality of heat exchanging hoses or pipes of a corrosion and adhesion inhibiting material, additional transfer conduits of a corrosion resistant plastic material interconnecting the hoses or pipes of the third and fourth heat exchangers to conduct a forcibly recirculating heat carrying medium, and coating means of a corrosion resistant and adhesion inhibiting plastic material covering all parts of the third and fourth heat exchangers which come into contact with a crude or clean gas stream.

Accordingly, this invention provides for two series connected heat transfer systems operating at different temperatures levels. The crude gas which is still very hot with about 140° C. is first guided through a heat exchanger which exhibits smooth or ribbed thick walled heat exchanging pipes of steel. In the heat exchanging pipes a cooling to about 115° C. takes place. The circulating heat carrier takes over the heat of the crude gas and transfers the same to the clean gas stream by means of a second heat exchanger arranged in the latter. During the circulation of the heat carrying medium care is taken that constant temperatures in a range between 105° C. to 120° C. are present so that at no location of the heat transfer system consisting of steel the wall temperatures drop below the condensation or dew point of sulfuric acid. At temperatures above 65° C. all liquid drops which are still present in clean gas downstream of the drop separator scrubber are practically vaporized. Consequently, no encrustation can be formed on the surfaces of the heat exchanger in the clean gas stream. Of course, for safety reasons the additional installation of soot blowers can be made.

In the second stage, that means at a lower level, the additional heat transfer system of this invention is employed whose material consists of corrosion resistant and adhesion inhibitive plastics. The temperatures of the heat transfer medium employed for the additional heat transfer system cause the crude gas to cool down from for example 115° C. to 95° C. The temperatures of the heat carrying medium circulating in the plastics heat transfer system amount to about 75° C. Due to this temperature level the dew or condensation point of sulfuric acid is passed through at the site of the crude gas in the range of the additional heat exchanger. The resulting sulfuric acid is partially run off or dripped downwards along the plastic hoses or pipes or partially mixed with ashes remains to adhere to the hoses or pipes. For cleaning the adhered acid portions from the hoses a cleaning water can be used which is collected and returned to the scrubber.

Heat withdrawn from the heat carrying medium circulating in the plastic hoses or pipes, (the medium can be for example water protected by an antifreeze agent) is applied to another low temperature heat exchanger arranged between the scrubber and the second heat exchanger of steel. The transferred heat is taken over by the clean gas stream and the latter is heated up from about 50° C. to temperatures about 65° C. In this manner it is achieved that all water drops still present in the gas stream at the upstream side of the heat exchanger, are vaporized. In doing so it may happen that gypsum contained in the drops remains behind when gypsum drops can be formed on the plastic upper surface of the low temperature heat exchanger. However, due to the adhesion inhibiting quality of the upper surface of the employed plastic material such encrustation can be easily removed by vibrations. Also a temperature alternation can be used for such cleaning.

The invention makes it possible to employ conventional pressure resistant material such as steel as a working material in the range of high temperatures above the dew point of sulfuric acid in the range of the crude gas stream, and above 65° C. in the dry range in the clean gas stream. In contrast, in the low temperature rang both in the crude gas stream and in the clean gas stream practically pressureless hoses or pipes of plastic material are applied. Both heat transfer systems which are staggered one after the other, can be arranged at an arbitrary point in the crude and clean gas stream. Even an arrangement in which the respective heat exchanging systems in the crude gas stream and in the clean gas stream are spaced apart more than 50 meters and interconnected by heat medium conduits, present no problems. The device of this invention can be also additionally provided in old desulfurizing installations. Since the clean gas is prevented from being polluted by the crude gas, it is possible to arrange a blower both in the dry crude gas stream as well as in the dry clean gas stream. The achieved separation grades in the scrubber are preserved that means they correspond also to the separation grade of the desulfurizing plant for flue gases. Since this invention makes it possible to utilize conventional corrosion resistant and durable plastic materials a long service life of the device is achieved and even after long operational times no wear or functional impairment of the heat exchangers will occur.

The plastic materials used in the low temperature heat exchangers is polytetrafluorethylene or polyvinylidenfluoride or polypropylene. Heat exchangers constructed of such plastic materials of course can be subject to relative low internal pressures. At higher temperatures and pressures such plastic materials tend to plasticize and accordingly the requisite temperature and inner pressure must be maintained. However, by a suitable selection of the heat carrying medium below 100° C. as well as by the provision of cascaded water source before the individual heat exchangers, a plastic material of a relatively low pressure resistance can be safely employed because these measures guarantee that pressures which may occur in the low temperatures heat exchangers will never exceed the permissible level and also suddenly occurring temperature increases in the flue glass cannot increase pressure in the interior of the exchangers.

Preferably, the plastic hoses or pipes in the low temperature heat exchangers are in the form U-shaped pieces suspended at the ends of their arms. Such hoses or pipes can be arranged in a plurality of bundles whereby each heat exchanging bundle can be individually inserted into the heat exchanger and replaced even during the operation of the device. In low temperature heat exchangers provided with U-shaped heat exchanging pipes or hoses the distributing and collecting chambers for the heat carrying liquid can be arranged outside the gas stream and consequently the access to the latter is improved in a very simple manner.

In the case of a vertically directed gas stream there can be used freely suspended hoses of plastic material extending in horizontal direction.

The fastening of the plastic hoses or pipes in the bottom walls of the heat exchanger is made preferably by inserting the hoses or pipes in matching openings in the bottom wall and thereafter connection sockets are inserted into the end portions of the hoses so that the latter are enlarged and pressed to the inner wall of the openings. It is of advantage when the connecting sockets or plugs are made of copper or brass. In order to improve the intake flow of heat carrying water in the hoses or pipes, the end portions of the latter have a funnel-shaped configuration. In order to prevent bending of the hoses or pipes at the bottom wall, the length of the connecting sockets exceeds the thickness of the bottom wall of the heat exchanger.

According to another feature of this invention, the collecting and distributing chambers of the low temperature heat exchangers are separated by a corrosion-resistant gas-tight partition from the gas stream. In this manner, the inlet of individual hoses or pipes in the distributing or collecting chambers can be controlled during the operation of the device and in the case of emergency the hoses or pipes can be loosened. This measure also permits the application of conventional materials of high strength for constructing the collecting and distributing chambers whereby the corrosion-resistant materials of reduced strength are applied separately in the gas tight partition.

Due to the elasticity of flexible hoses or pipes of plastic material the latter can be mounted in the bottom wall without any additional sealing means. Water pressure in the interior of the hoses or plastic pipes which is higher than the expected gas pressure at the outer walls, insures a self-sealing action of the hoses.

The plastic hoses or pipes are arranged opposite splashing means which permit a flood-like discharge of cleaning water which loosens any encrustation, dust and sulfuric acid mixtures from the anti-adhesive upper surfaces of the hoses. The splashing means is preferably in the form of a distributing pipe which projects in each bundle of hoses or pipes to discharge cleaning water from lateral openings arranged at regular intervals one from the other. The suspended U-shaped hoses or pipes are held in position by roof-shaped spacers which insure not only a proper guidance of the hoses but also secure a proper run off of cleaning water.

According to another feature of this invention at least the low temperature heat exchanger arranged in the clean gas stream includes a vibrator by means of which any encrustation deposited on the hoses or pipes are removed by shaking. The vibrating or shaking action can be also combined with the temperature expansion of the employed plastic material so that during temperature changes the deposited encrustations peel off.

The novel features which are considered a characteristic for the invention are set forth in particular in the appended claims. The invention itself however both as to its construction and its method of operation, together with additional objects and advantages thereof will be best understood from the following description of specific embodiments when read in connection with the accompanying drawing.

DESCRIPTION OF THE PREFERRED EMBODIMENTS

Figure 1:
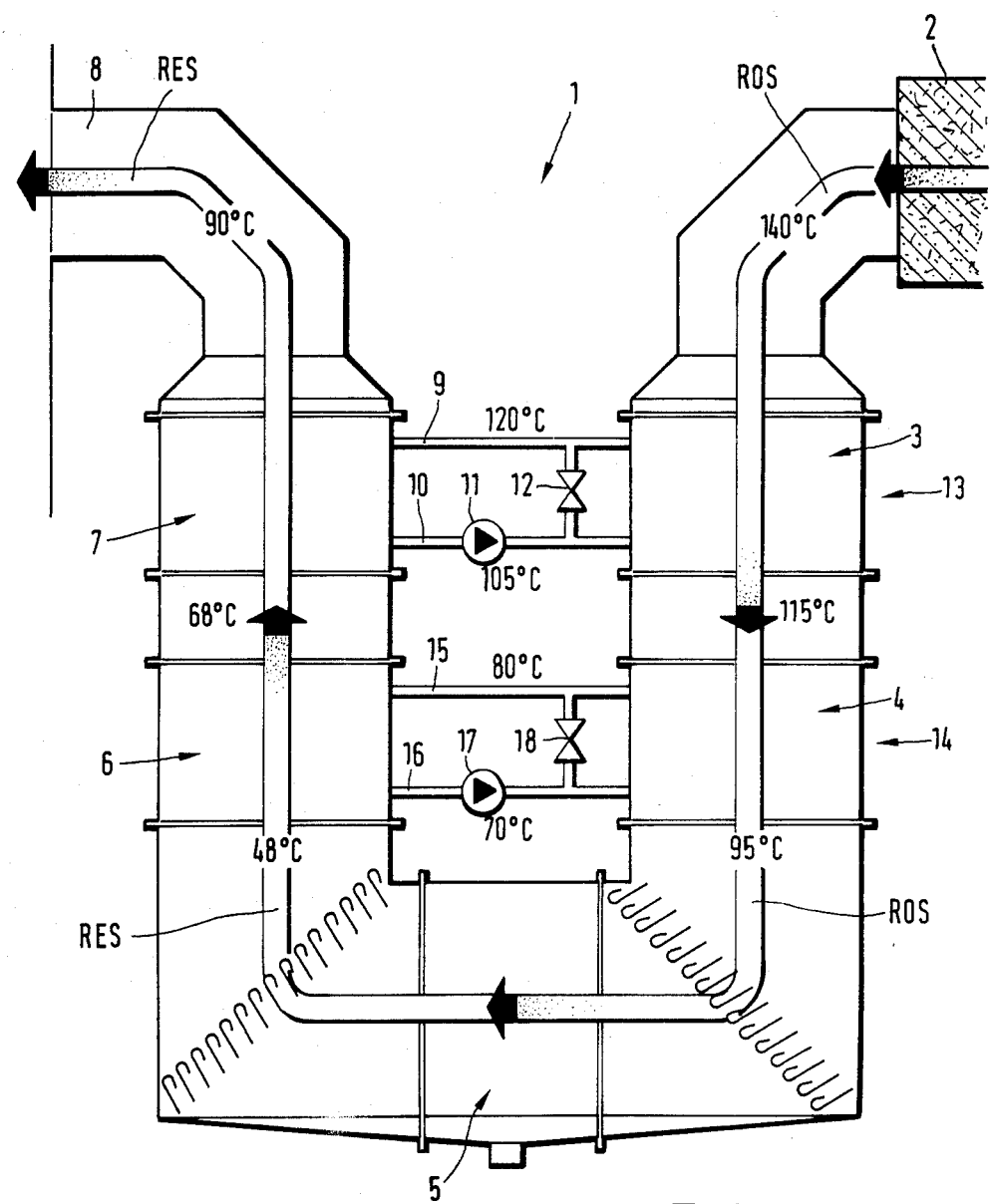
FIG. 1 is schematic representation of a flue gas desulfurizing installation having two consecutively arranged and mutually staggered heat transfer systems according to this invention.

The installation 1 illustrated schematically in FIG. 1 represents in this example a component of a coal burning power station and serves for desulfurizing stack of flue gases produced in the power station.

Crude gas ROS discharged in the direction of arrow from an electric filter 2 has a temperature of about 140° C. and at this temperature it is fed first through a first heat exchanger 3 which is made of steel and includes an array of parallel extending ribbed heat exchanging pipes which for the sake of clarity are not shown in the drawing.

After the discharge from the first heat exchanger 3 the crude gas ROS has a temperature of about 115° C. At this temperature the crude gas ROS is admitted in a further heat exchanger 4 which will be explained in greater detail below with reference to FIGS. 2 through 6.

The heat exchanger 4 discharges the crude gas ROS at a temperature of about 95° C. into a scrubber 5 in which by a wet process sulfur is freed.

At the outlet of the scrubber 5 the flue gas is cleaned and has a temperature of about 48° C. and at this temperature the clean gas RES is fed through another additional heat exchanger 6 which communicates through a heat exchanging connection with the heat exchanger 4 in the crude gas stream ROS. Consequently, the clean gas stream RES is heated up in the heat exchanger 6 to about 68° C. and subsequently is fed into a final heat exchanger 7 which communicates via a heat exchanging circuit with the first mentioned heat exchanger 3 in the crude gas stream ROS.

After discharge from the heat exchanger 7 the clean gas stream RES has a temperature of about 90° C. at which is discharged through chimney 8 in the outer atmosphere.

The heat exchangers 3 and 7 located respectively in the crude gas stream and in the clean gas stream, are provided with ribbed, thick wall steel pipes and are interconnected via conduits 9 and 10 for circulating a heat carrying fluid. The fluid consists for example of water protected by an antifreeze agent. The heat carrying water is heated in heat exchanger 3 to a temperature of about 120° C. and flows through conduit 9 into the heat exchanger 7 where it is cooled down to a temperature of about 105° C. The return of the heat carrying water is forced by a pump 11 in conduit 10. By bypass conduit with regulating valve 12 between the conduits 9 and 10, the temperature of the heat carrying fluid is regulated to be between 105° C. and 120° C. so that at no location of the first stage 13 of the heat transfer system which is constructed of steel, the temperatures fall below the dew point of sulfuric acid.

Also in the second stage 14 of the heat transfer system of the flue gas desulfurizing installation 1, including the heat exchangers 4 and 6 arranged respectively in the crude gas stream and the clean gas stream, the transfer conduits 15 and 16 circulate the heat carrying medium between the two heat exchangers. The heating medium is again water protected by an antifreeze agent and the temperature of the circulating water is in the range between 70° C. and 80° C. The heat carrying water is heated up in the heat exchanger 4 which is arranged in the stream of crude gas ROS to a temperature of about 80° C., flows through conduit 15 to the heat exchanger 6 in the clean gas stream RES and transfers heat to the clean gas stream. As a result, the temperature of the heat carrying fluid drops to about 70° C. At this temperature the heat carrying water is returned, for example by means of a pump 17, in the heat exchanger 4 in the crude gas stream. The conduits 15 and 16 are also interconnected by a bypass conduit provided with a regulating valve 18.

Inasmuch as temperature of circulating heat carrying fluid in the second heat transfer system 14 is about at 75° C., condensation or dew point of sulfuric acid is passed through at the site of the crude gas. In order to prevent damage to the heat transfer system 14, all component parts in the two heat exchangers 4 and 6 which come into contact with the gas, are coated with a corrosion resistant and adhesion inhibiting plastic material. This plastic material can be for example polytetrafluorethylene, polyvinylidenfluoride or polypropylene. Also the transfe conduits 15 and 16 for the heat carrying liquid circulating between heat exchangers 4 and 6 is preferably made of at least corrosion-resistant plastic material.

Figure 2:
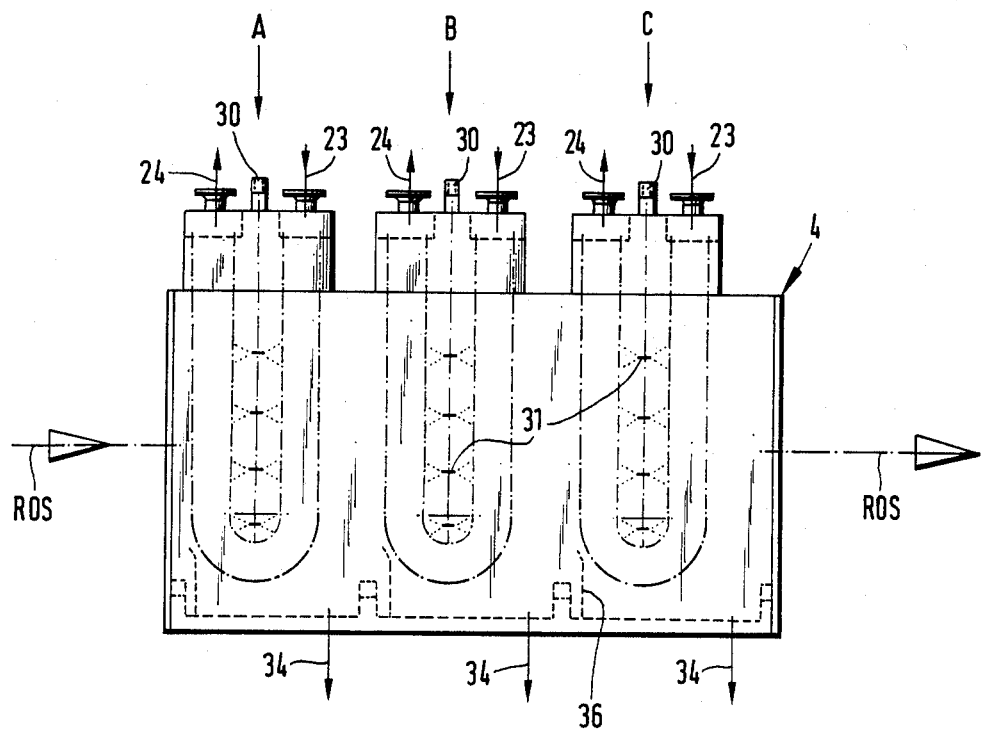
FIG. 2 is an elevational view of a low temperature heat exchanger for the heat transfer systems of FIG. 1.
Figure 3:
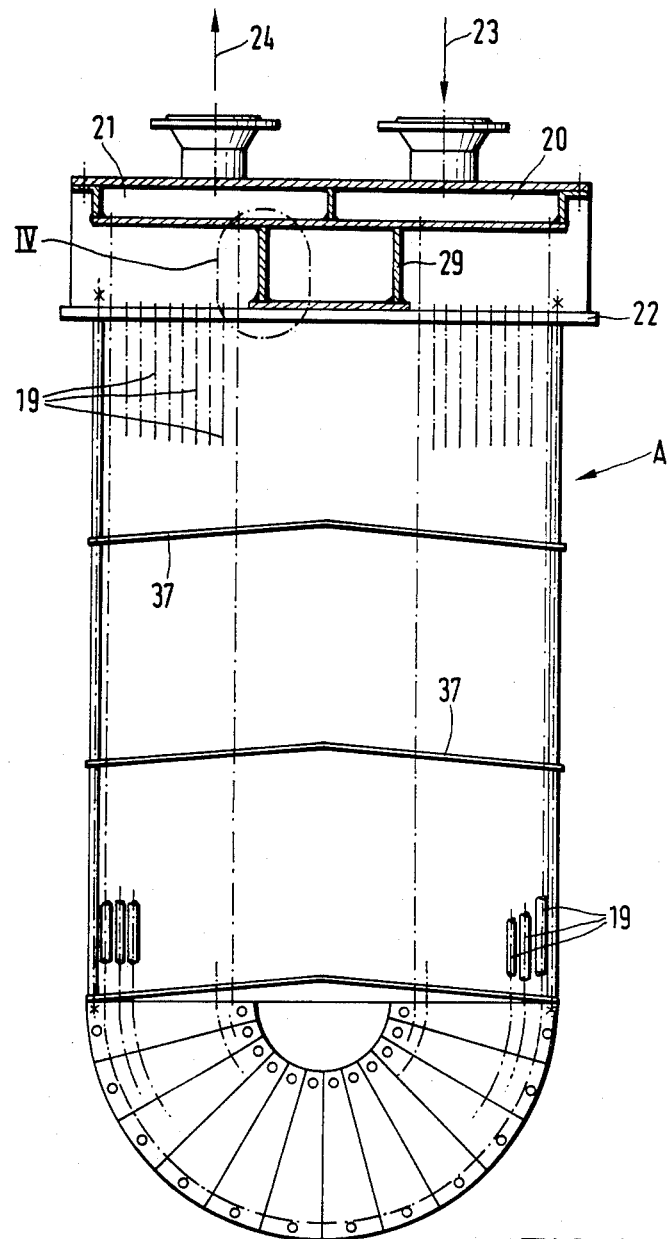
FIG. 3 illustrates schematically in a sectional view a bundle of heat exchanging elements in the heat exchanger of FIG. 2, shown on an enlarged scale.

Referring to FIGS. 2 and 3, there is illustrated a heat exchanger 4 of FIG. 1 which in this example is arranged in a horizontally directed crude gas stream ROS. For the heat exchange, there are suspended in the gas stream bundles of U-shaped plastic hoses. The plastic material of the hoses can be for example polytetrafluorethylene, polyvinylidenfluoride or polypropylene.

The heat exchanger 4 of FIG. 2 is of the same configuration as the heat exchanger 6 in the stream of clean gas RES. The heat exchanger 4 is divided into three sections A, B and C which can be individually serviced even during the operation of the device. The bundles of U-shaped plastic hoses 19 in each section (FIG. 3) has the advantage that only a single distributing chamber 20 and a single collecting chamber 21 can be arranged at a common level which is outside the flue gas stream ROS or RES. The separation of the chambers from the gas stream is effected by a gas tight partition 22 of a suitable material. The heat carrying fluid enters in the direction of arrow 23 the inlet of the distributing chamber 20, passes through the U-shaped hoses 19 and is discharged from the collecting chamber 21 of each section A, B and C in the direction of arrow 24.

Figure 4:
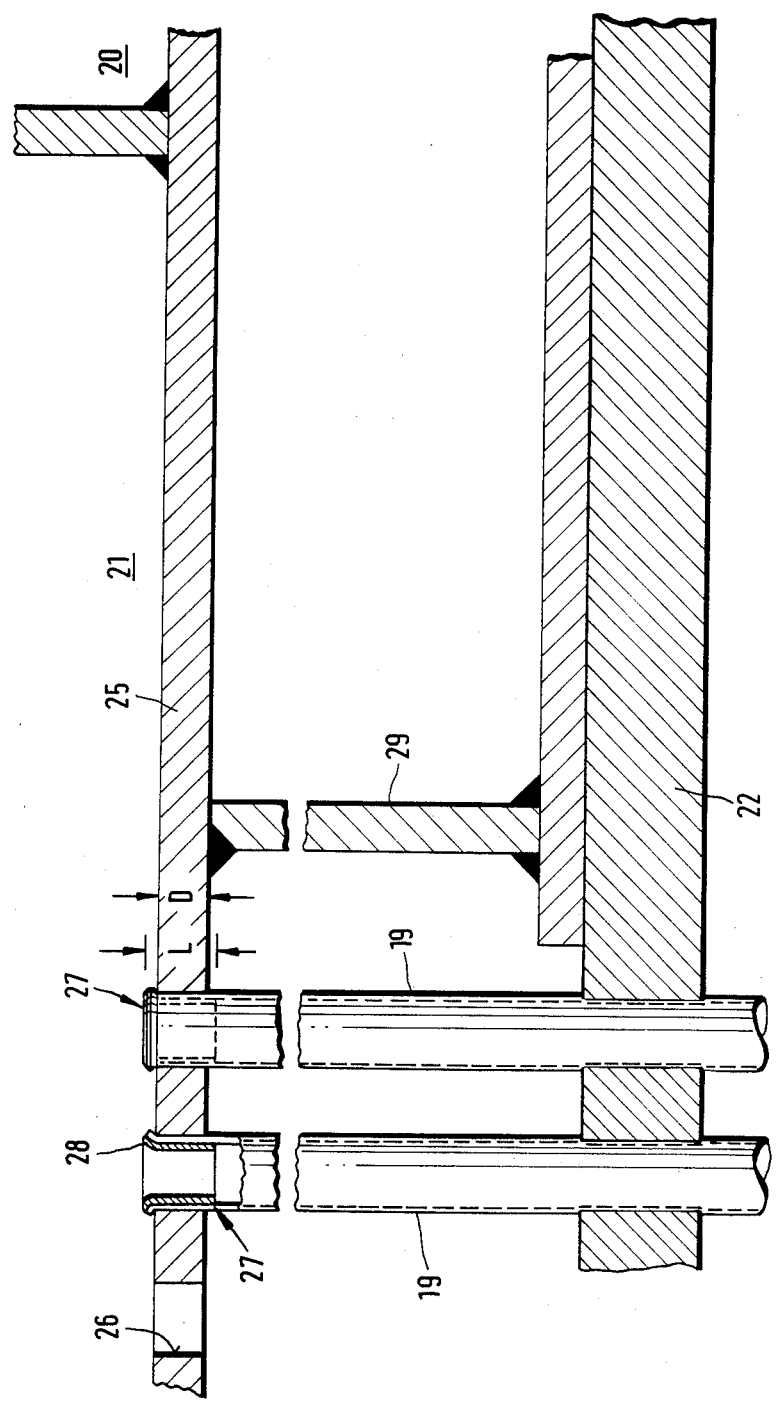
FIG. 4 is a sectional view of a cutaway part IV of the device of FIG. 3, shown on an enlarged scale.

As illustrated in the detailed view of FIG. 4, the individual hoses 19 are secured to a bottom wall 25 of chambers 20 or 21 in such a manner that the hoses pass through corresponding openings 26 in the bottom wall 25 and a connector socket 27 of a flat configuration and made preferably of copper or brass are inserted into the end portions so that the latter are firmly clamped against the inner wall of openings 26. The connector sockets 27 have a funnel-like shape, so that the water inlet or outlet 28 of respective hoses assumes a corresponding shape which reduces flow losses. In addition, the length L of the connector sockets 27 exceeds the thickness D of the bottom wall 25. In this manner the bending of hoses 19 below the wall 25 is prevented. The fixation of the hoses 19 in the corresponding openings in the gas pipe partition 22 is guaranteed by the pressure difference between the water pressure acting during the operation of the device on the inner wall of the hoses 19, and the expected low pressure of the gas stream acting on the outer walls of the hoses so that the hoses are firmly pressed against the passes in the partition 22.

Figure 5:
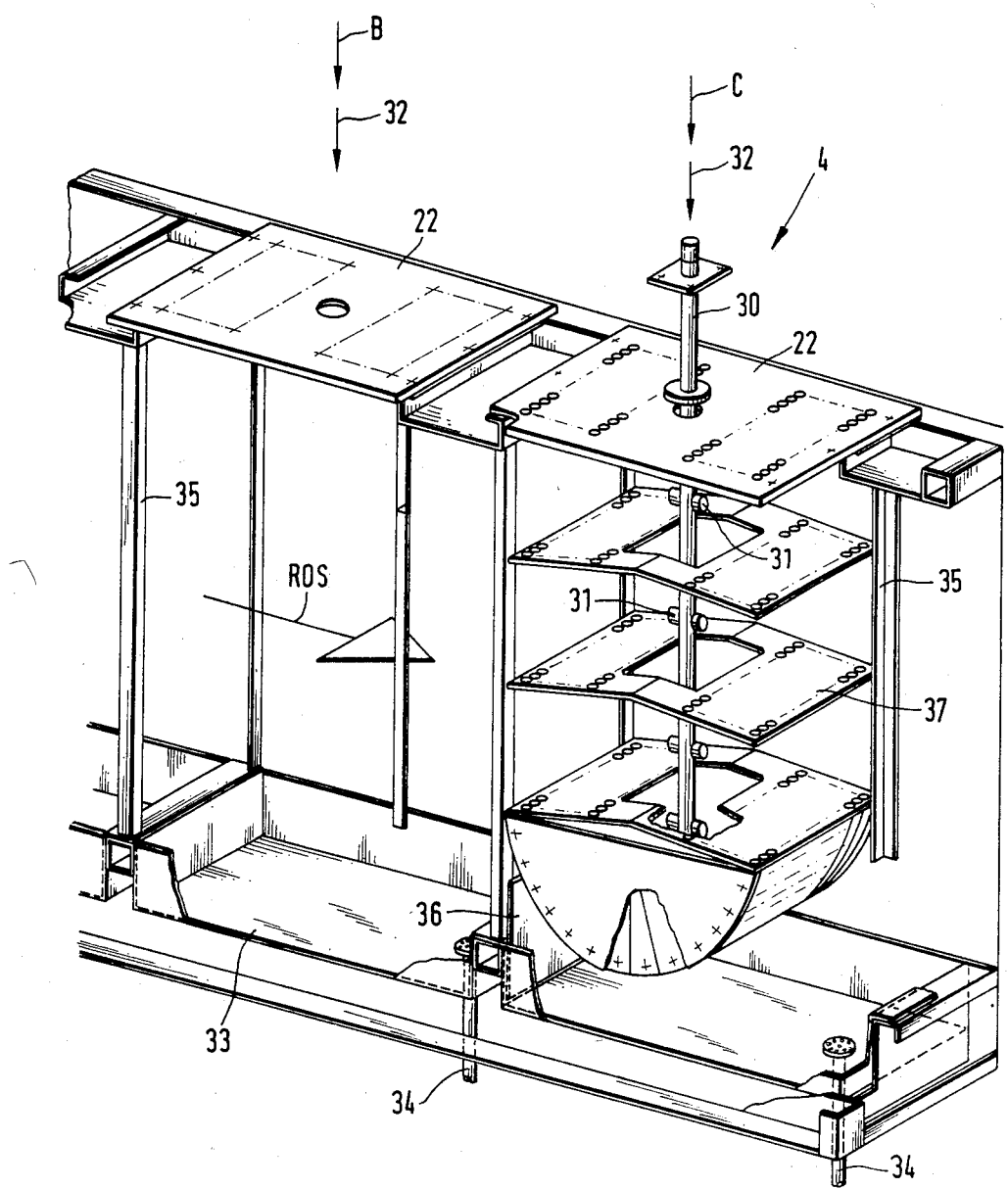
FIG. 5 is a perspective view, partly in section, of the heat exchanger of FIG. 2.

FIGS. 2 and 5 also illustrate that each section A, B, C of heat exchangers 4, 6 is provided with a vertical pipe 30 projecting through a central part of each bundle of hoses. The pipes 30 tightly pass through the gas-like partition 22 and in the area of heat exchanging U-shaped hoses it is provided with a plurality of discharge openings 31 arranged at different levels. When feeding cleaning water C in respective water pipes 30, as indicated by arrow 32, the bundles of U-shaped hoses 19 in each section A, B, C can be flooded by water jets emanating from the discharge openings 31. The used cleaning water is collected in underlying trays 33 and discharged through drain openings 34. All components parts of the heat exchangers 4 or 6 which during operation are brought into contact with the glue gas, consist of a plastic material which at least is corrosion resistant. These components include guiding struts 35 for the bundles, aprons 36 between the ends of respective sections, the trays 33 and drain outlets 34.

From FIGS. 3 and 5 it will be seen that the individual hoses 19 are positively held at different levels. For this purpose there are provided spacer plates 37 arranged in vertical direction one above the other and sloping in a roof-like fashion from a center plane to lateral sides of each section. The roof-like inclination of the plates 37 permits the used cleaning water to flow outside the heat exchanging sections into the underlying trays 33. The entire heat exchanger 4 or 6 or some parts thereof can if desired be brought into vibrations by a non-illustrated vibrating system.

Figure 6:
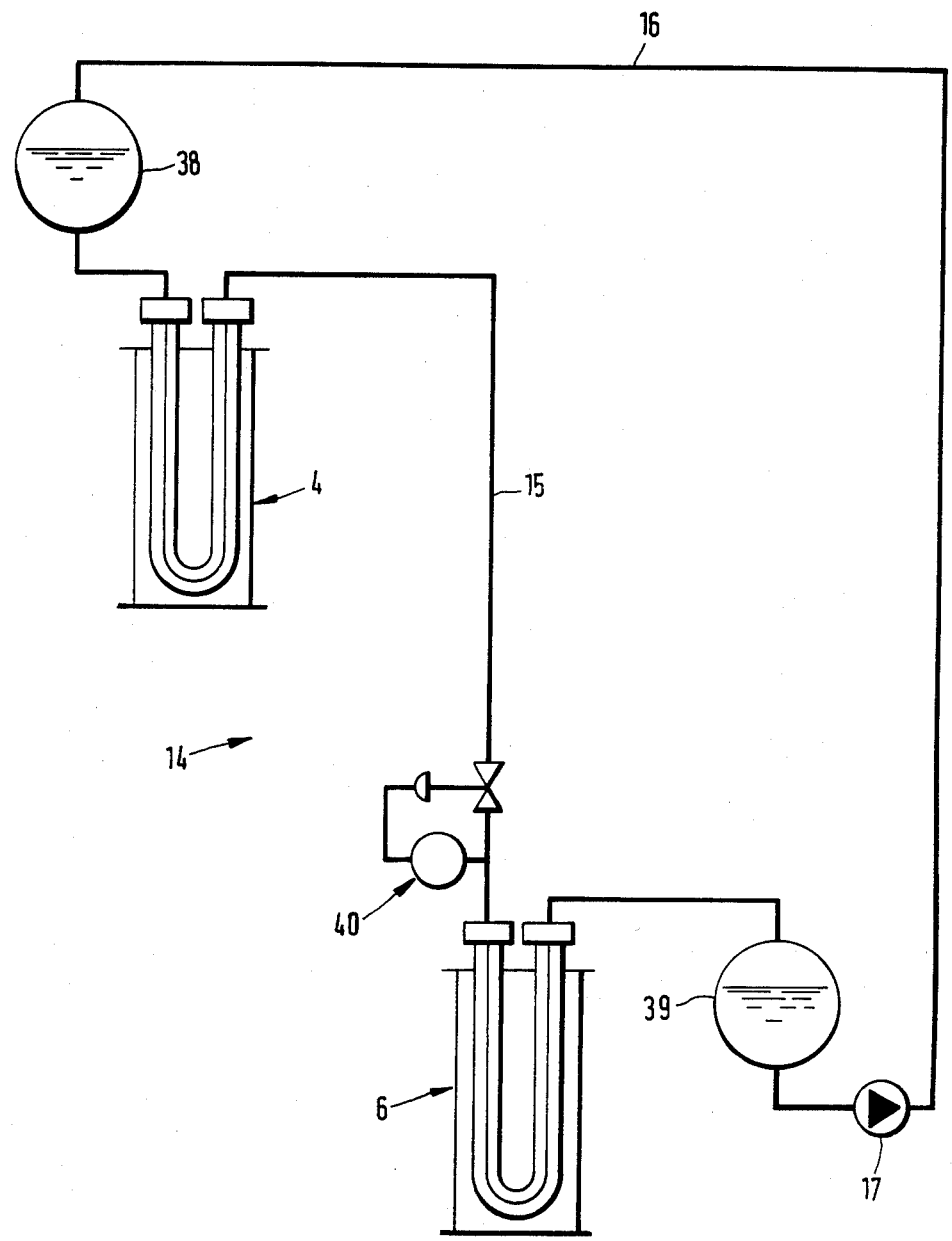
FIG. 6 is a schematic circuit diagram of another embodiment of the heat transfer device of this invention.

FIG. 6 illustrates an embodiment in which the low temperature heat exchangers 4, 6 of the second heat transfer system 14 are arranged at different geodetic levels. In order to prevent an excessive pressure increase in the heat exchangers 4 and 6, intermediate sources 38 and 39 for the heat exchanging fluid are arranged respectively before the heat exchanger 4 and behind the heat exchanger 6. The intermediate source insure that a predetermined water pressure is always present on the assigned heat exchanger. Heat carrying water flows through the heat exchangers 4, 6 by the force of gravity. The throughflow of the heat carrying water in the lower heat exchanger 6 is controlled by a pressure controlled regulating valve 40 in the conduit 15. A pump 17 in conduit 16 delivers the heat carrier from the lower storer 39 to the upper water store 38.

It will be understood that each of the elements described above, or two or more together, may also find a useful application in other types of constructions differing from the types described above.

While the invention has been illustrated and described as embodied in connection with a desulfurizing installation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. An energy transfer device for use in a desulfurizing installation including a first heat exchanger arranged in a stream of crude gas flowing through a scrubber, a second heat exchanger arranged in a stream of clean gas behind the scrubber, the first and second heat exchangers including heat exchange pipes and being interconnected by transfer conduits for a forcibly circulating heat carrying fluid, the heat exchange pipes and the transfer conduits being made of a pressure resistant metal material such as steel, the device comprising a third heat exchanger arranged in the stream of crude gas between the first heat exchanger and the scrubber, a fourth heat exchanger arranged in the stream of the clean gas between the scrubber and the second heat exchanger, said third and fourth heat exchangers operating at lower temperature levels than those of the first and second heat exchangers, said third heat exchanger including a plurality of heat exchanging hoses of a corrosion-resistant and adhesion inhibiting plastic material suspended in the stream of crude gas, said fourth heat exchanger including a plurality of heat exchanging hoses of a corrosion resistant and adhesion inhibiting plastic material suspended in the stream of clean gas, additional heat transfer conduits interconnecting the third and fourth heat exchangers to conduct a forcibly circulating heat carrying fluid, said additonal heat transfer conduits being made of at least corrosion-resistant plastic material, and all remaining parts of said third and fourth heat exchangers which contact the crude or clean gas stream being coated with a corrosion-resistant and adhesion inhibiting layer of plastic material.

2. An energy transfer device as defined in claim 1, wherein said hoses of the lower temperature third and fourth heat exchangers and said additional heat transfer conduits are made of polytetrafluorethylene or polyvinylidenfluoride or polypropylene and the coating of the remaining parts being made of the latter materials.

3. An energy transfer device as defined in claim 1, wherein the two lower temperature exchangers are arranged at different geodetic levels and including a return conduit communicating with two intermediate stores for the heat carrying fluid.

4. An energy transfer device as defined in claim 3, wherein the transfer conduit between the two lower temperature heat exchangers is provided with a pressure controlled regulating valve.

5. An energy transfer device as defined in claim 1, wherein said third and fourth lower temperature heat exchangers include U-shaped hoses of said plastic material which are suspended in vertical direction in horizontally directed streams of the crude or clean gas.

6. An energy transfer device ds defined in claim 1, wherein said hoses of said plastic material are freely suspended in horizontal direction in vertically directed streams of the crude and clean gas.

7. An energy transfer device as defined in claim 1, wherein said hoses of said plastic material have free end portions arranged in openings of a bottom wall of the corresponding heat exchanger, and connector sockets inserted into said free end portions to clamp the same against the inner wall of said openings.

8. An energy transfer device as defined in claim 7, wherein said connector sockets are made of copper or brass.

9. An energy transfer device as defined in claim 7, wherein at least the outer end portions of said connector sockets have a funnel-shaped configuration.

10. An energy transfer device as defined in claim 7, wherein the length of the connector sockets exceeds the thickness of said bottom wall of the corresponding heat exchanger.

11. An energy transfer device as defined in claim 1, wherein each of said lower temperature heat exchangers includes a distributing chamber communicating with the inlets of said hoses and a collecting chamber communicating with the outlets of said hoses, and a gas tight corrosion resistant partition separating said distributing and collecting chambers from the stream of crude and clean gas.

12. An energy transfer device as defined in claim 11, wherein said gas tight corrosion resistant partition is provided with openings for passing through said hoses, whereby the pressure difference beteeen the heat carrying fluid in said hoses or pipes and the gas stream provides for a self-sealing action of said hoses or pipes in the openings.

13. An energy transfer device as defined in claim 1 further including means for flooding said hoses or pipes of plastic material with cleaning liquid.

14. An energy transfer device as defined in claim 5 further comprising at least one spacer plate holding in position the vertically directed arms of said U-shaped hoses of said plastic material, said spacer plates having a roof-like configuration to guide off cleaning water.

15. An energy transfer device as defined in claim 1 further comprising means for vibrating at least one of said lower temperature heat exchangers to remove encrustations from outer walls of said hoses or pipes of plastic material.

* * * * *